(12) United States Patent
Johansson et al.

(10) Patent No.: US 8,365,058 B2
(45) Date of Patent: Jan. 29, 2013

(54) SAFE INFORMATION TRANSMISSION VIA NON-SAFETY APPROVED EQUIPMENT

(75) Inventors: Rikard Johansson, Linköping (SE); Jan-Erik Eriksson, Linköping (SE); Peter Stendahl, Linköping (SE)

(73) Assignee: SAAB AB, Linköping (SE)

( * ) Notice: Subject to any disclaimer, the term of this patent is extended or adjusted under 35 U.S.C. 154(b) by 1213 days.

(21) Appl. No.: 11/691,512

(22) Filed: Mar. 27, 2007

(65) Prior Publication Data

US 2007/0260967 A1 Nov. 8, 2007

(30) Foreign Application Priority Data

Mar. 28, 2006 (EP) .................................... 06111844
Jul. 5, 2006 (EP) .................................... 06116634

(51) Int. Cl.
*G06F 7/02* (2006.01)
(52) U.S. Cl. ........................ 714/819; 345/170; 341/22
(58) Field of Classification Search .................. 714/819; 345/170; 341/22
See application file for complete search history.

(56) References Cited

U.S. PATENT DOCUMENTS

| 3,934,242 | A | * | 1/1976 | Mueller | 345/170 |
| 4,458,266 | A | * | 7/1984 | Mahoney | 348/155 |
| 4,791,485 | A | * | 12/1988 | Kuroda et al. | 375/240.12 |
| 2007/0176867 | A1 | * | 8/2007 | Reggiardo et al. | 345/87 |
| 2008/0263461 | A1 | * | 10/2008 | Robb et al. | 715/760 |

FOREIGN PATENT DOCUMENTS

WO WO2004057553 7/2004

* cited by examiner

*Primary Examiner* — Guy Lamarre
(74) *Attorney, Agent, or Firm* — Venable LLP; Eric J. Franklin

(57) ABSTRACT

A method of detecting communications errors by coding messages as pictures. A communications method useable to safely communicate a message or a signal from a first safety approved entity to a second safety approved entity via a third, non-safety approved entity including that each command is sent with the aid of a command message from the first to the second entity, an acknowledge message from the second to the first entity, and a go-ahead message from the first to the second entity.

8 Claims, 7 Drawing Sheets

US 8,365,058 B2

SAFE INFORMATION TRANSMISSION VIA NON-SAFETY APPROVED EQUIPMENT

CROSS-REFERENCE TO RELATED APPLICATIONS

This application claims priority to European patent application 06111844.4 filed 28 Mar. 2006 and European patent application 06116634.4 filed 5 Jul. 2006.

FIELD OF THE INVENTION

The present invention refers to methods and devices within electronic systems for transferring information signals in a safe manner. In particular it refers to such methods and devices to safely communicate a message from one safety approved entity to another safety approved entity via non-safety approved entity.

BACKGROUND

When developing airborne systems equipment software, it is common to practise a standard known as RTCA/DO-178B. The standard requires systems to be classified as to criticality level. The standard requires that a system that may cause or contribute to a malfunction of a certain degree of seriousness must be developed according to certain rules. Software is classified in 5 levels, A to E, where A corresponds the most critical one, and E the least critical level. Cost for developing A and B-class software is approximately three times the cost for developing D class software. There are no requirements in RTCA/DO-178B on E-class software, so it is hard to compare costs. Software must be developed according to class A if a software error may lead to a crash with casualties, to class B if the error may lead to extensive personal injuries or severely reduced safety levels, and further levels C, D, E corresponding to less severe effects of an error.

In many applications, erroneous information may lead to very serious consequences (in these applications, class A software would be applicable). As an example, consider a case where erroneous information is sent to a weapons system, leading to erroneous firing.

Software classified as type A or B is expensive to develop and is in principle not allowed to be integrated or executed on a commercial computer using commercial-off-the-shelf software (COTS software) such as Windows or Linux operating system. Traditionally, all systems within an information chain has therefore been developed to class A or B, for the kind of functions mentioned above.

In connection with the introduction of Unmanned Aerial Vehicles (UAVs) there is a need to safely control these vehicles using principally COTS-products. This is not an alternative if the traditional method, cf. above, is to be used to achieve a safe flow of information. Also in other applications, the traditional method results in higher economical costs than would be the case if products have a lower class of criticality than A or B, or what would be the case if COTS products could be used both for hardware and software.

A typical application for the invention is to make it possible to remotely control an UAV using (in part) low cost COTS computer and software products, still fulfilling the requirements of applicable safety standards such as RTCA/DO-178B.

An object of the present invention is to provide a method for communication in safety critical systems without having to use safety approved equipment in all the communication chain, while still being able to fulfil applicable safety standards, such as RTCA/DO-178B.

Another object is to provide a method for easily detecting communication errors without having to rely on safety approved equipment.

A communication method comprising of the following steps:
   In a first entity, transferring a first set of data to a second set of data that represents the information in the first set of data as a number of graphical segments. These segments can be pixels (represented by x/y-coordinates), lines (represented by two sets of x/y-coordinates, defined the start and end-point of the line), polygons (defined by a number of x/y coordinates defined the corners of the polygons) or any other form of graphical segments.
   Transmitting the second set of data via a third entity
   Receiving the second set of data in a second entity
   Displaying the graphical segments defined by the second set of data in the second entity.
   Determining if the second data has been corrupted by the second or third entity.
   Taken appropriate actions depending on the outcome of the above.

Appropriate actions can be to either trust and use the information if it appears to not have been corrupted by the second or third entity or to take actions that will ensure that the first entity will know that information can no longer be received in a safe way. This can be accomplished by discontinuing a continuous communication between the first and second entity. This communication can be implemented using the following steps:
   Continuously, from the first entity, sending a unique code.
   Continuously, in the second entity, calculating a return value based on some algorithm.
   Continuously, in the first entity, verifying that the calculated return value from the first entity is correct. If not so, the first entity is to take proper actions due to communications loss with the second entity.

BRIEF DESCRIPTION OF THE DRAWINGS

These and other features, aspects and advantages of the present invention will become better understood with reference to the following description, appended claims, and accompanying drawings where

DETAILED DESCRIPTION OF PREFERRED EMBODIMENTS

When it comes to safe transferring of control commands, two failure modes can be identified. The first failure mode is if the command is lost or if it is erroneous but this is known. The second failure mode is when the command is erroneous but this is NOT known.

From a general point of view the second failure mode is worse than the first one. The technical solution of embodiments of the present invention handles safety aspects of the second failure mode.

Figure 1:
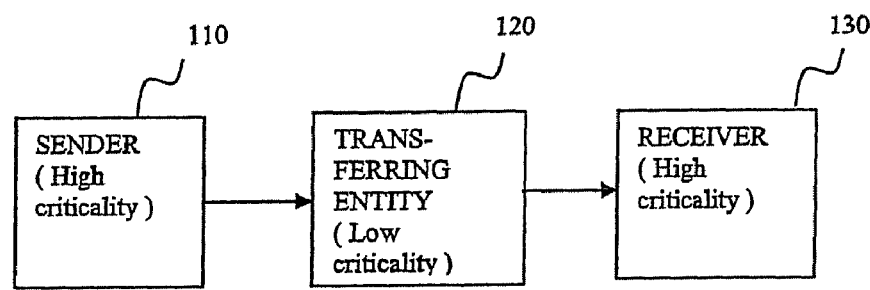
FIG. 1 is a block diagram showing the three principal entities involved when using a method according to the invention.

Referring to FIG. 1 case two above can be generalized as follows. A sender 110 sends a command to a receiver 130. Both the sender 110 and the receiver 130 is of high criticality, i.e., they are considered, per definition, to be able to handle commands in a safe manner. Commands are sent via a transferring entity 120 of low criticality, which potentially may distort or corrupt data. If the command is designed in such a way that the receiver 130 can detect, with a high probability, that the command has been distorted (or is missing) and the receiver is provided with the capability to handle that situation, the total system i.e., the sender 110, the transferring entity 120 and the receiver 130, can be regarded as a safe system.

When judging the safety of a system according to the above, it is necessary to bear in mind all possible errors that may be induced by the transmitting entity 120. The system must in principle have such a high safety level that even if the transferring entity 120 was designed to inflict maximum damage, the system shall be able to handle this in a safe manner. The following design is devised to handle such cases of a maximum damage-inflicting transferring entity 120, and should be able to meet demands raised by airworthiness authorities.

Figure 2:
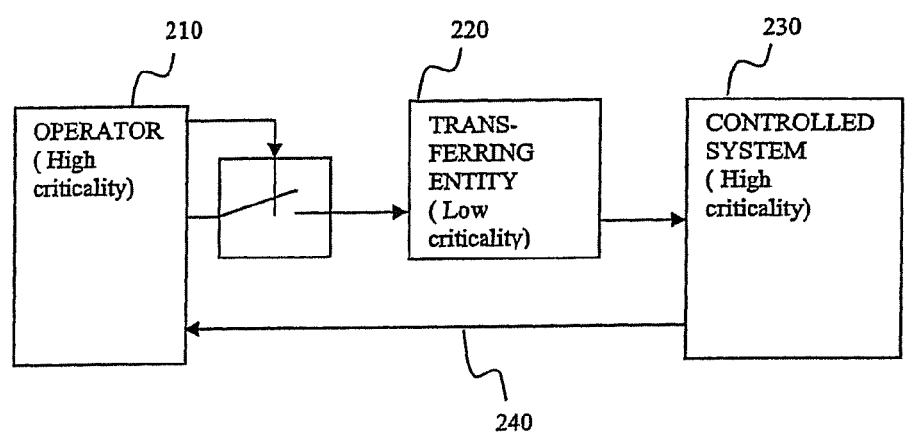
FIG. 2 is a block diagram showing entities of FIG. 1 for a preferred embodiment of the invention.

FIG. 2 shows a block diagram of a system according to a preferred embodiment of the invention. A controlled system 230 of high criticality sends all critical data to the operator 210 in such a way that any corruption of that data will be detected by the operator 210. For example, a checksum procedure may be used or a method in the form described by this invention. A method for the operator to issue a command to the controlled system 230 involves the following steps:

The operator 210 sends a command to the controlled system 230. This may be in an arbitrary way, e.g. as a 18 bit code.

The controlled system sends an acknowledge message of the command to the operator 210 via the safe communication link 240 together with a safety code, which may be a random number. The safety code is sent in such a way that the transferring entity 220 is considered not to have gained access to the safety code. The code may be sent as a picture or it may be encrypted.

The operator 210 checks that the controlled system has apprehended the correct command, i.e., that the transferring entity hasn't distorted data.

If the operator is of the opinion that the controlled system 230 has apprehended the correct command, the operator 210 sends in reply a go-ahead message comprising the safety code to the controlled system 230 via the transmission entity 220. Since the transferring entity 220 has no knowledge of the code, it can be argued that the transferring entity can not generate a correct code on its own.

In one embodiment, where the code was sent as a picture, the code itself is returned; this is possible because the transferring entity cannot reasonably be expected to be aware of the code itself because it was sent from the controlled system to the operator as a picture. In an alternative embodiment the operator 210, with the aid of some equipment (not shown) deciphering of an encrypted code and returns the deciphered code. Because the transferring entity 220 is not aware of the key, the transferring entity 220 cannot gain access to the code because it was sent encrypted from the controlled system 230 to the transferring entity 220.

When the controlled system 230 has received a correct code, it executes the command.

The controlled system 230 is devised such that it only accepts a certain number of sent codes per unit time. It is also devised to not accept codes received after a maximum time limit after the command was received. If too many codes are received per unit time or codes are received too late, the system 230 takes a predetermined action, such as disregarding the command and/or alerting the operator 210.

If the operator's command is distorted by the transferring entity, the operator will discover this when the system returns an acknowledgement of the command. The operator can then break off the connection, where after the controlled system 230 takes appropriate action.

Figure 3A:
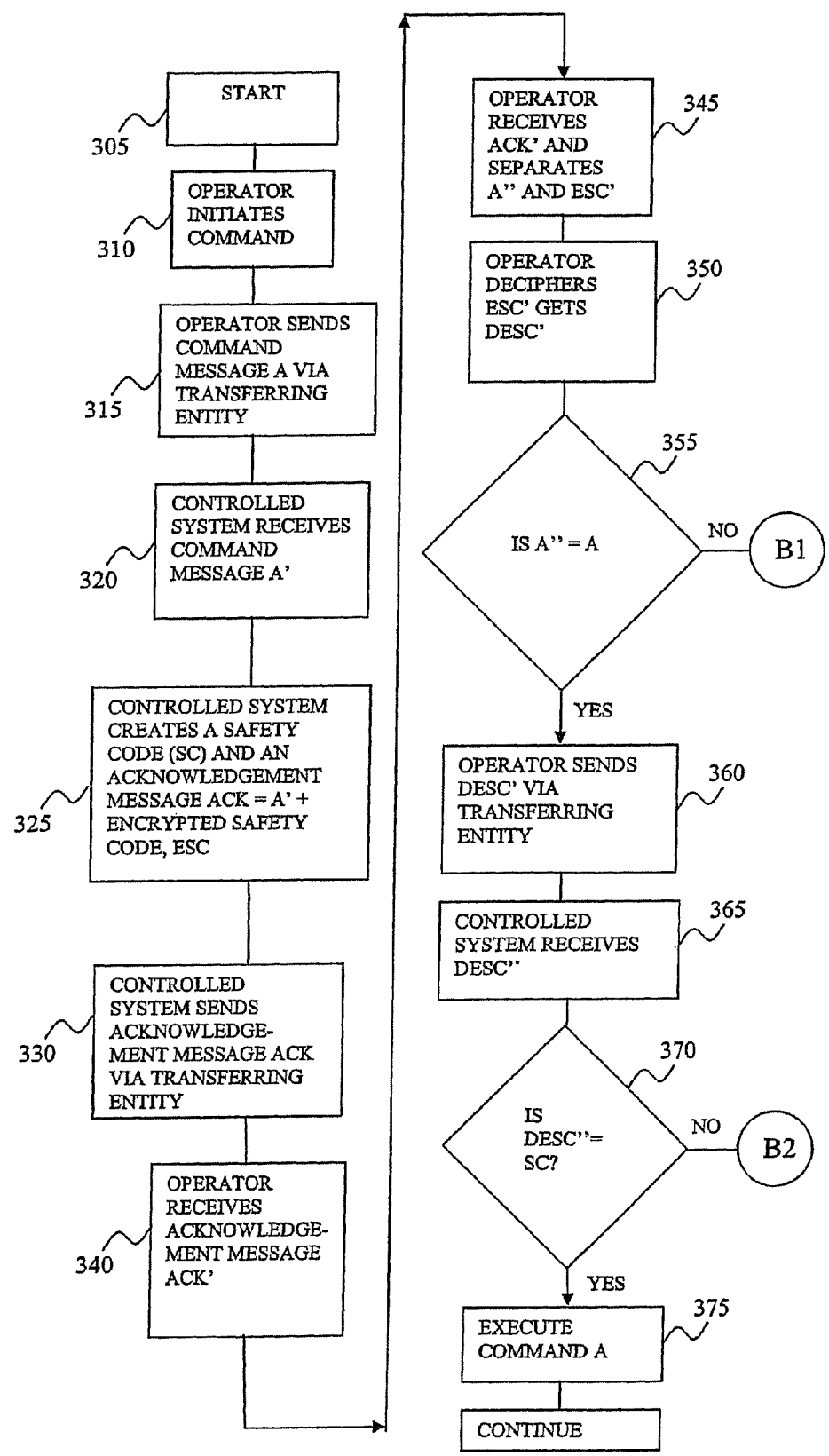
FIGS. 3a and b is a flowchart for a method according to a preferred embodiment of the invention.
Figure 3B:
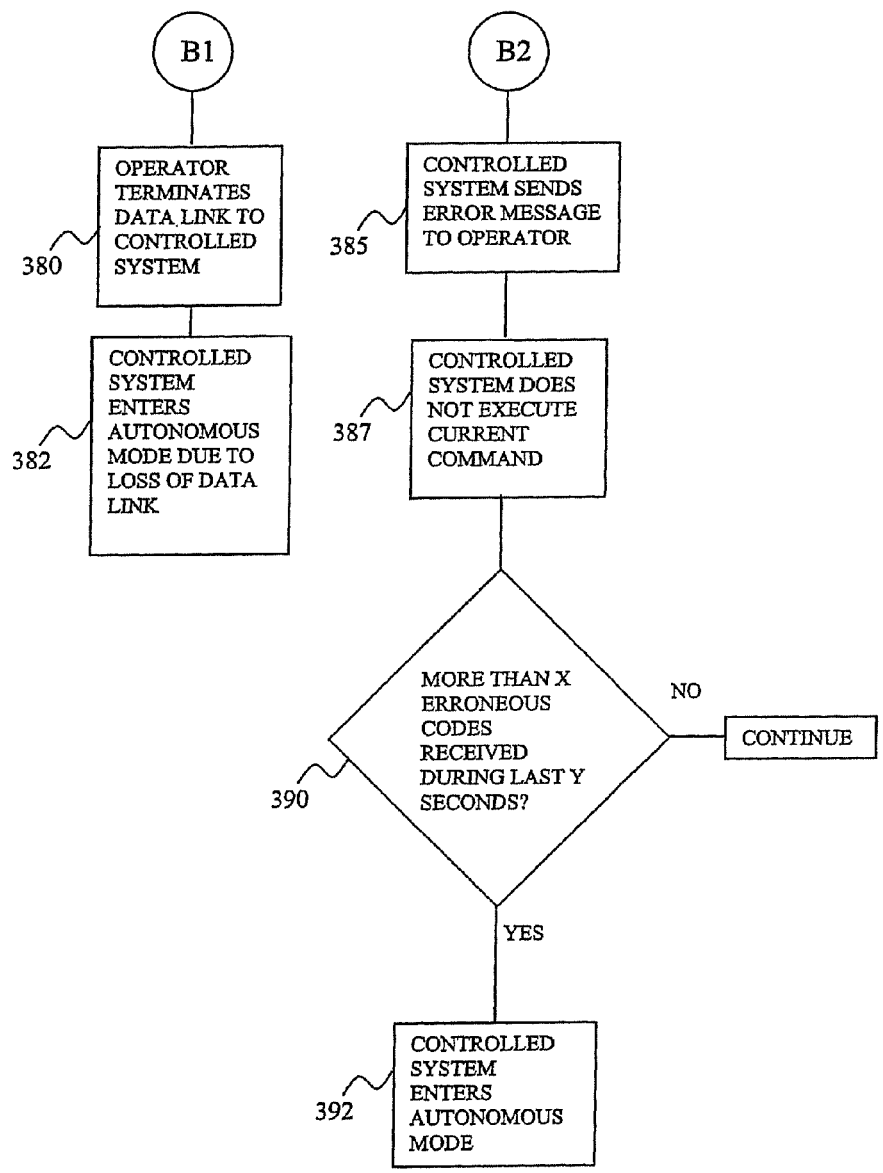

FIG. 3 shows a flowchart of a method for safe communication in the system of FIG. 2. The operator initiates 310 a command, by for example typing it in. The operator sends 315 a command message A to the controlled system via transferring entity. The controlled system receives 320 from the transferring system a command message A' which may be identical to the sent message A or distorted or corrupted in some way. Whether the transferred command message A' is distorted or corrupted or not is not decided at this point. Controlled system subsequently creates 325 a safety code SC and an acknowledgement message ACK. SC is encrypted forming an encrypted safety code ESC. ACK is formed by concatenating A' and the encrypted safety code ESC. The controlled system returns 330 acknowledgement message ACK via transferring entity. Subsequently, operator receives 340 transferred acknowledgement message ACK' which may be identical to sent acknowledgement message ACK or distorted or corrupted in some way. Operator takes ACK' and separates out 345 command message portion A" and transferred encrypted safety code portion ESC'. Operator deciphers 350 ESC' and gets deciphered ESC', here called DESC'.

By checking 355 if command message portion A" is identical to originally sent command message A, there can be decided if message is corrupted or not If command message portion A" is identical to originally sent command message A, command message is said to be safe, i.e. correctly received by controlled system, and a go-ahead message is sent to the controlled system in the form of the deciphered ESC' DESC'.

Subsequently controlled system receives 365 the transferred DESC', i.e. DESC", which may be identical to SC or corrupted in some way. Controlled system checks 370 if DESC" is identical to SC, and if so, decides that a command is safely received and executes 375 said command A.

If, when the operator checks 355 if A" is identical to A, this is not the case, the operator decides that there is not a safe transmission and therefore preferably terminates 380 data link to the controlled system. The controlled system detects this loss of data link and enters 382 an autonomous mode.

If, when the controlled system checks 370 if DESC" is identical to SC, this is not the case, the controlled system sends 385 an error message to the operator. The controlled system does not execute 387 the corresponding command A. The controlled system continuously keeps track of number of erroneous codes that have been received during a time period covering e.g. the last ten seconds. If this number becomes larger 390 than a predefined limit the controlled system determines that the data link is unsafe and enters 392 an autonomous mode.

By "autonomous mode" is for the purpose of the present application meant a mode where the controlled system, which may be an UAV, enters into a self control mode and performs a number of predetermined safe actions. Said actions may include climbing to a predetermined altitude, flying to a predetermined location, and landing there.

Returning to FIG. 2, in a further embodiment, the controlled system is provided with a periodic code transmitter, which periodically sends a code to the operator 210, who, based on the code, sends a predetermined answer. This may be implemented as an algorithm or as a large set of predetermined code-answer pairs. The operator is provided with equipment which automatically performs the answering-operation but which the operator always can shut off in a safe way.

Picture Coded Data

In a further preferred embodiment an operator communicates with a controlled system over a non-safe transmission entity. The controlled system is provided with means to code all critical data that is to be sent to the operator in a certain way that enables the operator to easily discover transmission errors. In a preferred embodiment the critical data is coded as a picture. The picture format is designed such that if the transmission entity corrupts the data, the operator will inevitably discover it.

Figure 4:
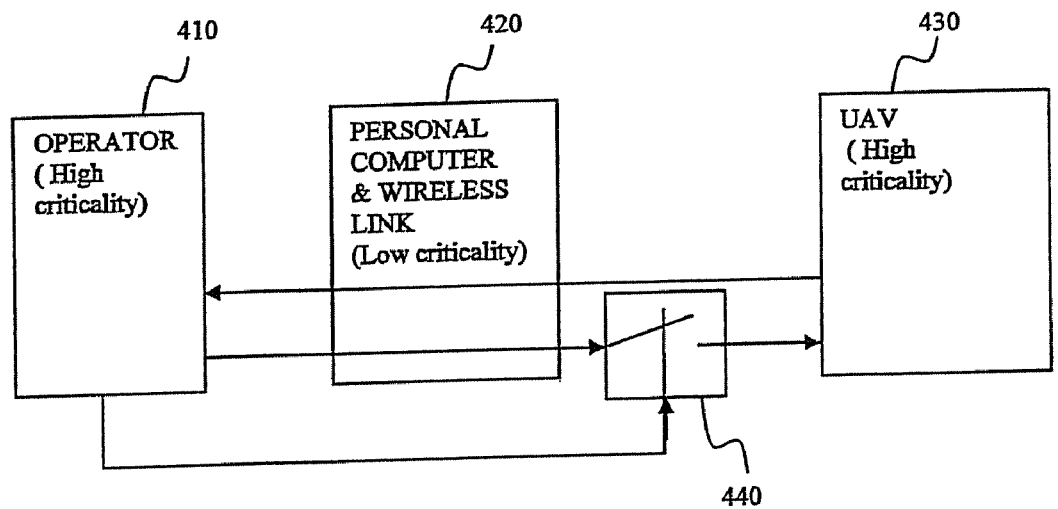
FIG. 4 is a block diagram showing another embodiment of the invention.

FIG. 4 is a block diagram showing another embodiment of the invention. An operator 410 uses a commercial off the shelf (COTS) personal computer (PC) 420 and a wireless link communication equipment to control an UAV 430. It is possible for the operator to stop the communication by breaking up data transmission to the UAV 430 by opening a switch unit 440. The switch unit 440 may comprise a power switch to the PC and/or wireless link communication equipment 420 or a circuit breaker, breaking up transmission only in the direction towards the UAV 430 or the switch function may be implement as follows:

- A random code is generated by the UAV 430
- The code is transmitted to the operator 410 via the wireless link and the PC 420
- As part of the PC 420 a unit is used that recodes the code according to set of rules only known by the unit and the UAV 430.
- Transmitting the recode code to the UAV 430
- In the UAV 430, determining if the recoding was done according to the rules.
- If coding was not done according to the rules or if no response was received, the UAV 430 will assume that data can no longer be sent in a safe way.
- The operator may at any time remove the unit in the description above to break of communication with the UAV.

When the UAV does not receive proper go-ahead messages, the UAV determines that the data link is unsafe and enters an autonomous mode as explained above. The operator thus always, in a safe manner, has the ability to force the UAV into autonomous mode in spite of loss of communication. As explained above, the operator sends commands to the UAV and receives confirmation in the form of certain safety codes, from which it is possible to determine if the command is correctly received by the UAV, as explained in detail above. In a preferred embodiment the controlled system, e.g. an UAV, is provided with means to create a safety code and an acknowledgement message as described above where said safety code is encrypted by coding it as one or more pictures. With the term "code a message as a picture" is for the purpose of the present application meant that a first message string is transformed to a second message string using a transformation method that enables the message to be presented as a picture, and where said transformation method is devised such that when said picture is displayed on a display organ the picture enables a viewer of said picture to discover errors that has influenced the second message string during, e.g. a transmission process.

Figure 5:
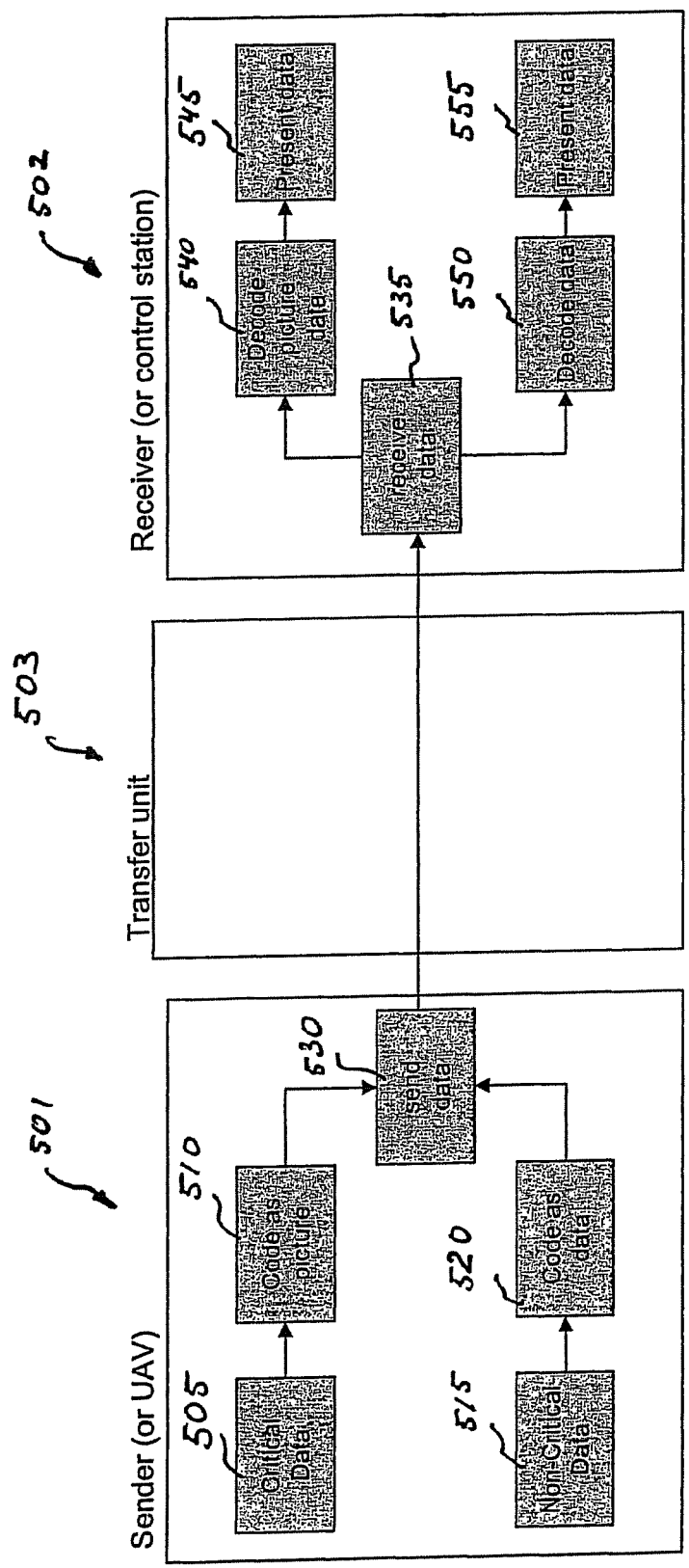
FIG. 5 is a block diagram showing units for data to picture coding and decoding.

FIG. 5 is a block diagram showing units for data to picture coding and decoding. A sending unit 501 is provided with a critical data unit 505 handling critical data. The critical data unit 505 is connected to a picture coding unit 510 that can transform critical data received from the critical data unit 505, by means of a transformation method coding a critical data message as a picture. The picture coding unit 510 is connected to a transmitter 530 for transmitting the coded message. The sending unit 501 also comprises a non-critical data unit 515 connected to a data coding unit 520 which in turn is connected to the transmission unit 530.

A receiving unit 502 is provided with a receiver 535 for receiving data and split the received data into picture code data and normal "data coded" data. The picture code data is sent to a picture data decoder 540 which decodes the data an present it as a picture with the aid of a picture presentation unit 545. The receiver 535 is also connected to a data decoder 550, which is connected to a data presentation unit 555, for presenting normal, non-picture coded data.

For example, if the controlled system must send a number between 0 and 255, this number can be sent in one (1) byte. If the transmission entity would corrupt these data, the operator would not be able to recognise it, because each corruption would result in another, valid, number. If, in contrast, the controlled system instead sends the number as a number of picture elements that have to correspond to each other to create a continuous picture, the operator can recognise that the transmission entity has corrupted data, and take appropriate measures, e.g. abort transmission completely such that the controlled system discovers this and takes appropriate measures. The feature of aborting the transmission is a critical one and therefore is designed and tested to be safe.

Figure 6A:
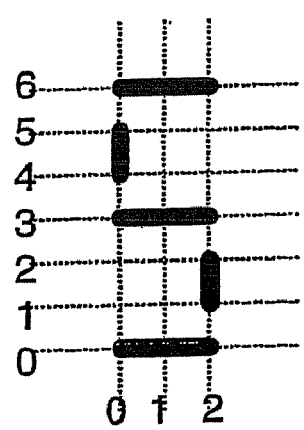
FIG. 6 is a sketch explaining picture coding of the digit five according to a possible embodiment of the invention.

Consider the following example:

The digit five is to be sent. FIGS. 6a and b is a sketch explaining picture coding of the digit five according to a possible embodiment of the invention. The digit is constructed of a number of segments. The segments are in the shape of short straight lines having a first and a second end. The position of a line end is defined by X and Y coordinates. Each line is thus defined by four numbers, X1,Y1,X2,Y2 corresponding to the x and y coordinates of the first and second line end respectively.

Table 1 describes a method of building the digit five. A transmission sequence for the digit five thus would be: 0,0,2,0, 2,1,2,2, 0,3,2,3, 0,4,0,5, 0,6,2,6.

TABLE 1

| Line number | X1 | Y1 | X2 | Y2 |
|---|---|---|---|---|
| 1 | 0 | 0 | 2 | 0 |
| 2 | 2 | 1 | 2 | 2 |
| 3 | 0 | 3 | 2 | 3 |
| 4 | 0 | 4 | 0 | 5 |
| 5 | 0 | 6 | 2 | 6 |

Figure 6B:
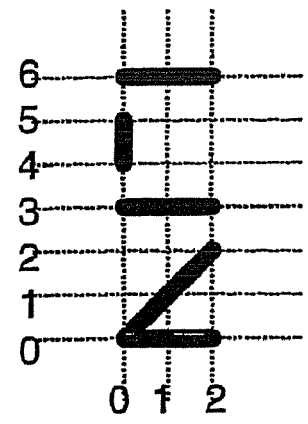

A faultless transmission would result in the picture of FIG. 6a, and a transmission introducing a fault may result in the picture of FIG. 6b.

The appearance of the transmitted symbols, e.g. the digit five described, has a great influence on the ability of the system to provide a really safe method. Single transmission errors must not result in another valid symbol. The characters of a first message may be chosen from a set of alphanumerical characters 0-9, A-Ö, a-ö. In another embodiment said first message characters are chosen from a set of digital digits 0-9. In still a further embodiment said first message characters are chosen from a set of binary digits 0-1.

Figure 7:
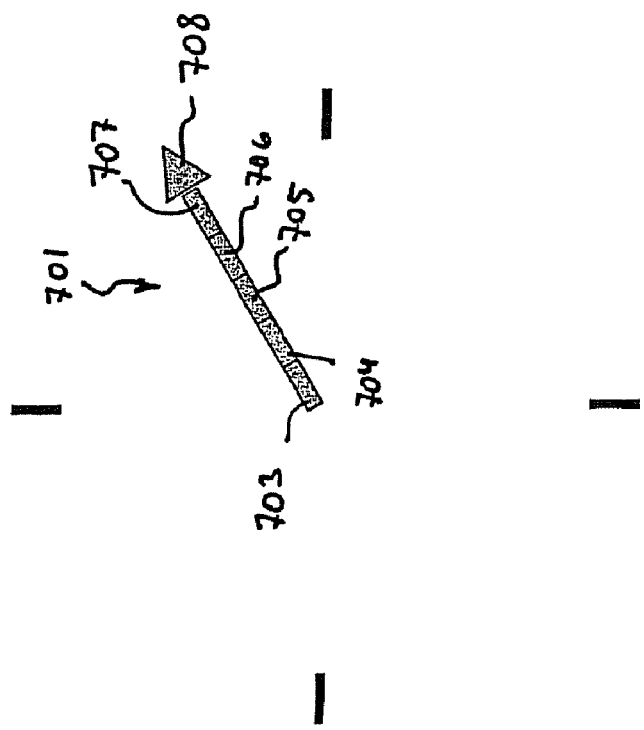
FIG. 7 is a sketch of an arrow representing a message coded as a picture with the aid of a method according to an embodiment of the invention.

In yet another embodiment a method for coding a critical signal message to be sent over non-safety approved equipment. FIG. 7 shows a way to code an angle, in this particular case aircraft heading, as picture data, i.e. as an arrow pointing within a compass card. FIG. 7 shows an arrow 701 made up of six polygons 703-708.

Angle data is converted to picture data with the aid of a table or algorithm where angle data, e.g. "45" is converted to six consecutive groups of data, each group defining a three or four side polygon in a X/Y coordinate system by defining their corners. Each polygon may also be assigned a colour in order to improve human-machine interface performance.

If transmission in some way corrupts the signal message, this becomes visually detectable in that one (or more) polygon(s) receives a shape that diverge from an expected rectangular and triangular shape, respectively.

Figure 8:
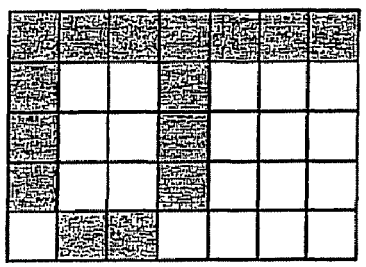
FIG. 8 is a sketch explaining picture coding of the digit nine according to another embodiment of the invention.

FIG. 8 shows the digit nine as a picture defined by a number of pixels. Each pixel is defined by a X-coordinate and a Y-coordinate. The digit shown is thus represented by a number of, in this case 15, X/Y coordinate pairs. It is also possible to give each pixel a colour by assigning it a colour code as described above.

If, in the embodiment of FIG. 8, transmission in some way corrupts the signal message, this will become visually detectable by the operator when viewing a display displaying said signal message as a picture, in that one or more pixels will be absent or in a different location than expected.

Preferably, the receiving entity displays incoming data as graphical elements (dots, pixels, lines, polygons) as received. The transmitting entities are provided with means to send a message forming a picture, then waits a time interval, e.g. 50 ms, then overwriting all elements with, drawing new pictures, waits 50 ms and so on.

In an alternate embodiment the receiving entity automatically erases the picture after a certain time, e.g. after 50 ms the last element was sent.

The invention claimed is:

1. A communications method for enabling detection of communication errors, said method comprising:
    transforming a first message string into a second message string using a transformation method that enables the first message string to be presented as a picture, wherein when said picture is displayed on a display organ, such that the picture enables a viewer of said picture to discover errors that have influenced the second message string;
    transmitting said second message string;
    receiving said second message string;
    displaying said second message string as a picture on a display organ;
    comparing the picture representing the second message string with a picture representing a faultless transmission to determine if the second message string has been corrupted and a communication error has occurred, wherein the picture representing the second message string includes elements other than horizontal and vertical line segments; and
    taking action depending upon whether or not the second message string has been corrupted.

2. The method according to claim 1, wherein said transforming comprises
    converting first message string characters to a second message string using a number of segments in a shape of straight lines having a first end and a second end, wherein a position of a line end is defined by X and Y coordinates, and wherein each line is defined by four numbers, X1, Y1, X2, Y2 corresponding to the x and y coordinates of the first end and second line end, respectively.

3. The method according to claim 1, wherein said first message string comprises a numerical string, and said second message string comprises a number of X/Y coordinates representing corners of a number of polygons, and said X/Y coordinates are chosen such that when said X/Y coordinates are used to render polygons, said polygons are forming a picture representing the information in said first message string.

4. The method according to claim 1, wherein said first message string comprises characters, and said second message string comprises a plurality of groups of X/Y coordinate pairs, each group of X/Y coordinate pairs representing a character in said first message string, and where said X/Y coordinates are chosen such that when a picture is rendered, each X/Y coordinate pair represents a pixel, or a center of a regular polygon of a certain size, wherein said picture forms said character in said first message string.

5. The method according to claim 2, wherein said first message string characters are alphanumerical characters 0-9, A-Ö, a-ö.

6. The method according to claim 5, wherein said first message characters are digital digits 0-9.

7. The method according to claim 5, wherein said first message characters are binary digits 0-1.

8. A communications system, comprising:
    a processor configured to transform a first message string into a second message string using a transformation method that enables the first message string to be presented as a picture;
    a transmitter configured to transmit the second message string;
    a receiver configured to receive the second message string; and
    a display configured to display said second message string as a picture to enable a viewer of said picture by comparing the picture representing the second message string with a picture representing a faultless transmission to determine if the second message string has been corrupted and a communication error has occurred to discover errors that have influenced the second message string, wherein the picture representing the second message string includes elements other than horizontal and vertical line segments.

* * * * *